United States Patent

Patra et al.

(10) Patent No.: US 6,721,924 B2
(45) Date of Patent: Apr. 13, 2004

(54) NOISE AND POWER OPTIMIZATION IN HIGH PERFORMANCE CIRCUITS

(75) Inventors: Priyadarsan Patra, Portland, OR (US); Barbara Chappell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 192 days.

(21) Appl. No.: 09/964,803

(22) Filed: Sep. 28, 2001

(65) Prior Publication Data

US 2003/0066037 A1 Apr. 3, 2003

(51) Int. Cl.[7] .............................. G06F 17/50; G06F 9/45
(52) U.S. Cl. ....................... 716/2; 716/4; 716/5; 716/18
(58) Field of Search .............................. 716/2, 4, 5, 18

(56) References Cited

U.S. PATENT DOCUMENTS

| | | | | |
|---|---|---|---|---|
| 5,999,714 A | * | 12/1999 | Conn et al. ................... | 716/2 |
| 6,493,853 B1 | * | 12/2002 | Savithri et al. ............... | 716/5 |
| 6,532,574 B1 | * | 3/2003 | Durham et al. ................ | 716/6 |
| 2003/0079191 A1 | * | 4/2003 | Savithri et al. ............... | 716/4 |

OTHER PUBLICATIONS

ECSTASY: A New Environment for IC Design Optimization, IEEE International Conference on Computer–Aided Design, pp. 484–487, Nov. 1988.*

Conn et al., Circuit Optimization via Adjoint Lagrangians, 1997 IEEE/ACM International Conference on Computer–Aided Design, pp. 281–288, Nov. 1997.*

Conn et al., Noise Considerations in Circuit Optimization, 1998 IEEE/ACM International Conference on Computer–Aided Design, pp. 220–227, Nov. 1998.*

TILOS: A Posynomial Programming Approach to Transistor Sizing, Fishburn, J.P., Dunlop, A.E. Available from IEEE Service Cent. (Cat. Publ. by IEEE, New York, NY, USA, N 85CH2233–5), Piscataway, NJ, USA p. 326–328.

Timing driven cell replication during placement for cycle time optimization. Neumann, Ingmar and Post, Hans–Ulrich. Integration–The VLSA Journal 27 (1999) pp. 131–141.

Gate Size Optimization for Row–based Layouts, Maheshwari, Naresh and Sapatnekar, Sachin S.; Midwest Symposium on Circuits and Systems, vol. 2 (1995). IEEE, Piscataway, NJ, USA 95CB35853, pp. 777–780.

Automatic transistor sizing in high performance CMOS logic circuits. Hoppe, B; Neuendorf, G; and Schmidt–Landsiedel D.; VLSI and Computer Peripherals. Available from IEEE Service Cent. (Cat. Publ. by IEEE, IEEE Service Center, Piscataway, NJ, USA., Catalog No. 89CH2704–5), Piscataway, NJ, USA, pp. 5/25–27.

Timing optimization of mixed static and domino logic. Zhao, Min, Sapatnekar, Sachin S. Proceedings—IEEE International Symposium on Circuits and Systems. v. 6 1998. IEEE, Piscataway, NJ, USA 98CH36187, pp. 266–269.

(List continued on next page.)

Primary Examiner—A. M. Thompson
(74) Attorney, Agent, or Firm—Kenyon & Kenyon

(57) ABSTRACT

A system and computer implemented method of modifying characteristics of a circuit provide enhanced performance. One embodiment of the method provides for determining a set of objective parameters for the circuit and receiving noise constraints for the circuit. Values of the objective parameters are optimized based on the noise constraints. By using noise constraints in the optimization process, a number of performance issues can be addressed.

4 Claims, 7 Drawing Sheets

OTHER PUBLICATIONS

Interleaving Buffer Insertion and Transistor Sizing into a Single Optimization. Jiang, Yanbin; Sapatnekar, Sachin S.; Bamjil, Cyrus; and Kim, Juho; Available from IEEE Service Cent (Cat. Publ by IEEE, New York, NY, USA. 1063–8210/98), Piscataway, NJ, USA, pp. 625–633.

Mosiz: A Two–step Transistor Sizing Algorithm based on Optimal Timing Assignment Method for Multi–stage Complex Gates. Dai, Zhi–jian and Asada, Kunihiro; Available from IEEE Service Cent. (Cat. Publ. by IEEE, New York, NY, USA, CH2671–6/89/0000/0201), Piscataway, NJ, USA, pp. 17.3.1–17.3.4.

iCOACH: A circuit optimization aid for CMOS high–performance circuits. Chen, H.Y. and Kwang, S.M. Available from Elsevier Integration, the VLSI journal 10 (1991) 185–212.

* cited by examiner

24

24a 24b

Discrete Components

-Dynamic logic family #1
 -power levels
-Dynamic logic family #2
 -power levels
 ⋮

Tunable Components

-Static logic gate sizes
-Static logic power levels
-Static transistor widths
 ⋮

FIG. 4

NOISE AND POWER OPTIMIZATION IN HIGH PERFORMANCE CIRCUITS

BACKGROUND OF THE INVENTION

1. Technical Field

The present invention generally relates to integrated circuit design. More particularly, the invention relates to a computer implemented method of modifying circuit characteristics that involves noise and power optimization.

2. Discussion

Integrated circuit (IC) design is a critical component to the development of personal computers (PCs), personal digital assistance (PDAs), wireless communication devices and many other systems. In order to achieve the desired functionality and speed, logic of varying complexity must often be developed for the IC. In the past, standard logic has been executed by complementary metal-oxide semiconductor (CMOS) circuitry, which is well documented and widely used in industry. More complex, high speed logic has used domino circuits, which include both dynamic and static gates. Domino circuitry is described in a number of sources as U.S. Pat. No. 6,275,071 to Ye et al.

It has been determined that a number of tradeoffs must be made when developing high speed circuits such as domino circuits. For example, power consumption is a particular parameter that is often at odds with timing constraints. As a general matter, in order to reduce delays, more robust, power consuming gates must be used. Other tradeoffs relate to noise reduction and real estate minimization.

Conventional approaches to modifying given circuit characteristics in accordance with the above-described tradeoffs involve determining a set of objective parameters such as available device sizes and power levels, and obtaining various constraints for the circuit. Typically, timing constraints and physical constraints are often used to provide practical limits on the reduction of power levels and real estate usage. Thus, signals must arrive "on time", gates cannot be smaller than realistically possible, and the values of the objective parameters are optimized with these constraints in mind. While the above-described approach has been acceptable under certain circumstances, the increasing complexity of more recent logic architectures has brought to light a number of difficulties to be addressed.

A particular difficulty relates to noise. A major source of noise in an IC is capacitive and inductive coupling between two or more signal paths, and is often characterized as "crosstalk". Although noise coupling can have profound effects on timing and power considerations, and can lead to functional failure in domino logic, conventional approaches to circuit optimization often do not take into account these effects.

Another concern with regard to IC design is the manner in which traditional technologies approach the actual optimization. For example, earlier designs worked with only one path at a time, rather than performing a simultaneous solution of tradeoffs in sizing across a multi-output block. It has been determined that such path-wise optimization methods can exhibit unreliable convergence even if margins and interaction with place-and-route is neglected. While certain attempts have been made at simultaneous optimization, the inability to consider noise constraints limits their practical usefulness. Furthermore, these approaches do not include a mechanism for employing realistic gate delay models, especially if these models are non-convex and discrete.

Additionally, reported methods do not describe a mechanism for leveraging the cost-function information from the results of an optimization step. Such a mechanism would enable re-synthesis of netlists in order to improve power versus delay optimization. Conventional methods also do not show wiring/shielding directives and power-cost sensitivities being used to facilitate convergence with logic synthesis and place-and-route operations. Furthermore, designer or project input templates cannot adequately be used to configure and control the optimization and synthesis processes. In addition, many conventional methods of modifying circuit characteristics do not demonstrate the ability to optimize a mix of fixed and continuously tunable gates.

BRIEF DESCRIPTION OF THE DRAWINGS

The various advantages of the present invention will become apparent to one skilled in the art by reading the following specification and appended claims, and by referencing the following drawings, in which:

FIG. 4 is a diagram illustrating an example of a set of objective parameters in accordance with one embodiment of the present invention;

DETAILED DESCRIPTION OF THE PREFERRED EMBODIMENTS

A system and computer implemented method of modifying characteristics of a circuit provide enhanced performance. One embodiment of the method provides for determining a set of objective parameters for the circuit and receiving noise constraints for the circuit. Values of the objective parameters are optimized based on the noise constraints. By using noise constraints in the optimization process, a number of performance issues can be addressed.

Further in accordance with an embodiment of the present invention, a computer implemented method of optimizing objective parameter values is provided. A set of sensitivity factors is developed based on the objective parameters and noise margins in accordance with noise constraints for the circuits such that the sensitivity factors characterize a noise sensitivity of the circuit. Objective parameter values and modified noise margins are selected based on the sensitivity factors such that the objective parameter values minimize power costs to the circuit. The method further provides for repeating the developing and selecting until changes in the objective parameter values fall below a predetermined threshold.

In another aspect of the invention, a computer-readable storage medium stores a set of instructions, where the set of instructions are capable of being executed by a processor to form a method of optimizing values of objective parameters for a circuit.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and of the invention, and together with the description serve to explain the principles and operation of the invention.

Figure 1:
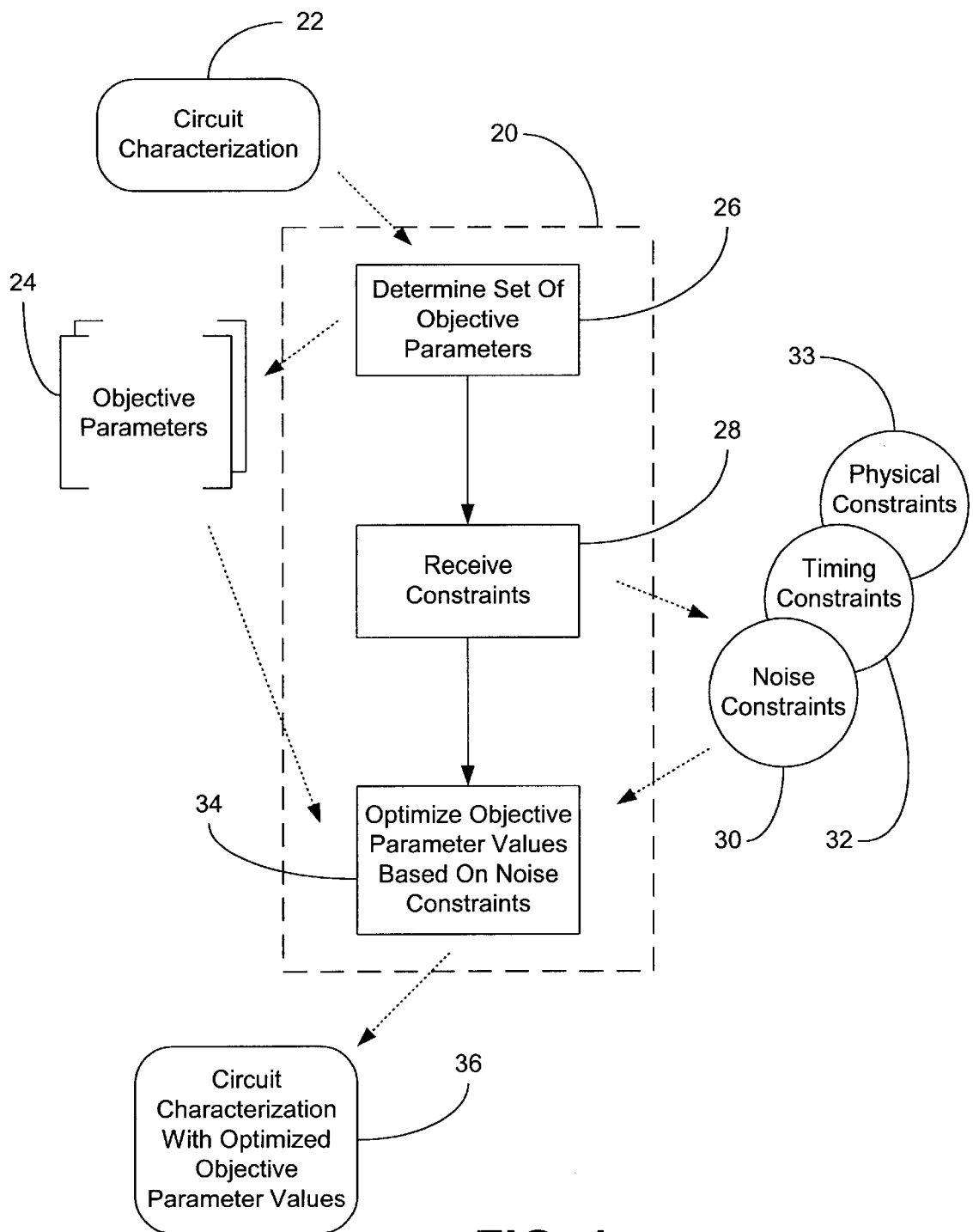
FIG. 1 is a flowchart of an example of a computer implemented method of modifying circuit characteristics in accordance with one embodiment of the present invention.

FIG. 1 shows a computer implemented method 20 of modifying characteristics 22 of a circuit (not shown). The circuit can be any type of integrated circuit, although the examples discussed herein will primarily refer to computer processors. The format of the circuit characteristics 22 may also vary depending on the application, but is preferably a netlist, which can be generated by any number of commercially available software packages. Netlists are widely understood in the industry, as apparent from the discussion in U.S. Pat. No. 6,289,491 to Dupenloup.

It can be seen that the method 20 generally provides for determining a set of objective parameters 24 for the circuit at processing block 26. As will be discussed in greater detail below, objective parameters 24 primarily relate to power consumption and the relationship can be either direct or indirect. For example, device power levels directly define the power costs associated with a given device, whereas device sizing indirectly defines power costs. The objective parameters 24 include such power related components, where the parameters 24 can take on power level and sizing values in accordance with various constraints, user-defined inputs and optimization directives. It can further be seen that block 28 provides for receiving noise constraints 30 for the circuit. Timing constraints 32 and physical constraints 33 are also obtained in accordance with other established principles and techniques. Values of the objective parameters 24 are optimized at block 34 based on the noise constraints 30 and the result is a modified circuit characteristics 36 with optimized objective parameter values.

It will be appreciated that the modified circuit characteristics 36 provides a unique solution to the difficult problem of power versus delay optimization in high speed circuits. The method 20 is used in conjunction with a larger system that includes library generation, logic synthesis, place-and-route, and physical compilation, and improves design productivity. As will be discussed in greater detail below, the method 20 provides shorter turn-around times for initial design, engineering change orders and other design processes. It should be noted that the method 20 is applicable to control applications as well as datapath applications and has been tested in both cases. Adaptation is provided to multiple types of circuit technologies and clocking methods.

Figure 2:
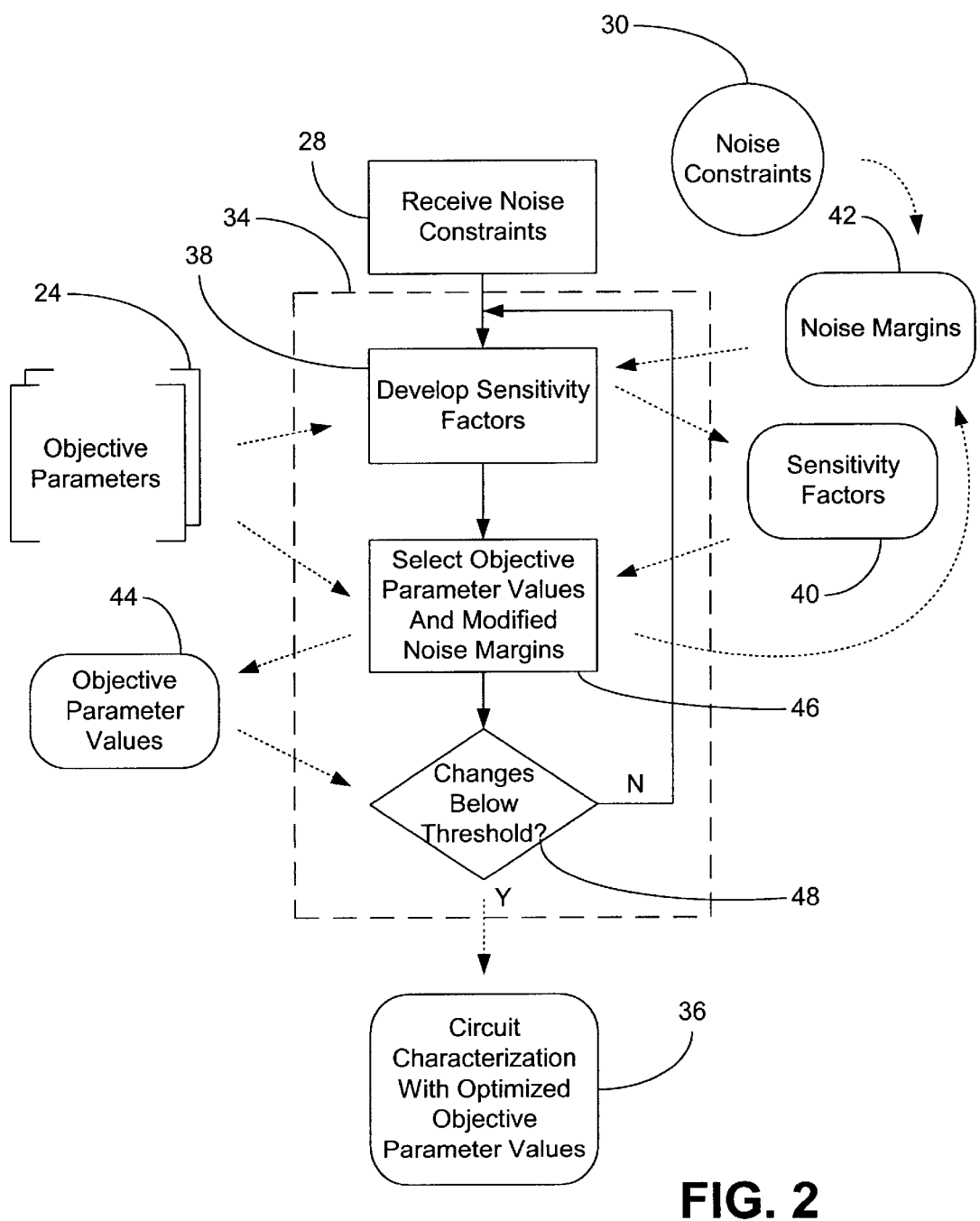
FIG. 2 is a flowchart of an example of a computer implemented method of optimizing objective parameter values in accordance with one embodiment of the present invention.

Turning now to FIG. 2, the preferred approach to optimizing objective parameter values 44 is shown in greater detail at block 34. Specifically, it can be seen that a set of sensitivity factors 40 is developed at block 38 based on the objective parameters 24 and noise margins 42 in accordance with the noise constraints 30. The sensitivity factors 40 therefore characterize a noise sensitivity of the circuit. It should be noted that timing constraints 32 and physical constraints 33 (FIG. 1) are also used in the sensitivity factor development process. Objective parameter values 44 and modified noise margins 42 are selected at block 46 based on the sensitivity factors 40 such that the objective parameter values 44 minimize power costs to the circuit. Processing block 48 provides for repeating the developing and selecting until changes in the objective parameter values 44 fall below a predetermined threshold. The sensitivity factors 40 therefore provide a unique approach to circuit optimization that enables the use of noise constraints 30 to iteratively apply noise margins 42 to the nodes of the circuit.

Figure 3:
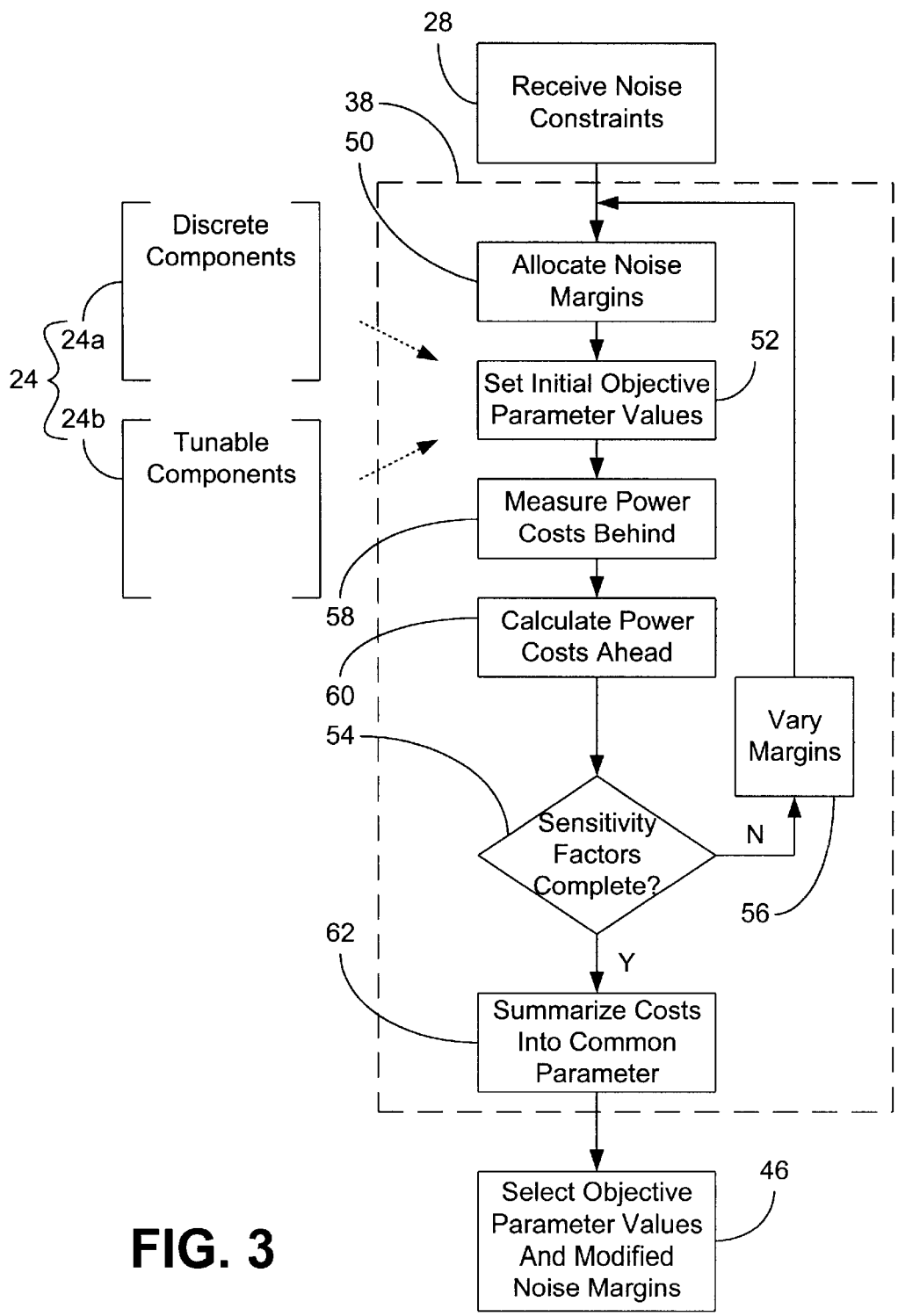
FIG. 3 is a flowchart of an example of a process for developing sensitivity factors in accordance with one embodiment with the present invention.

Turning now to FIG. 3, the preferred approach to developing sensitivity factors is shown in greater detail at block 38. Specifically, block 50 provides for allocating initial noise margins to a plurality of nodes in the circuit. Initial objective parameter values are set at block 52 in accordance with the initial noise margins. It can further be seen that blocks 54 and 56 provide for repeating the allocating and setting for varied noise margins. In particular, FIGS. 3 and 4 illustrate that discrete components 24a of the objective parameters can be selected such that the objective parameter values define dynamic logic settings. As best shown in FIG. 4, one or more dynamic logic families can be selected, where each dynamic logic family has dynamic gates with corresponding transistor widths and power levels. In addition to discrete components, continuously tunable components 24b of the objective parameters can be selected such that the objective parameters define static logic settings. One or more static logic gates may be selected where each static logic gate has corresponding widths and power levels. By partitioning the objective parameter value selection based on the tunability of the selected component, a more robust optimization system is achieved. This is particularly true with regard to high performance logic circuits such as domino circuits.

Returning now to FIG. 3, it can further be seen that during each pass, power costs to the full cone of logic behind each node in the circuit are measured at processing block 58. In addition, power costs to the full cone of logic ahead of each node in the circuit are calculated at block 60. These calculations and measurements are stored in an acceptable computer-readable memory (not shown) for summarization at block 62. Thus, by summarizing the measured and calculated power costs into a common sensitivity parameter custom-class results can be obtained with very little manual tuning.

Figure 5:
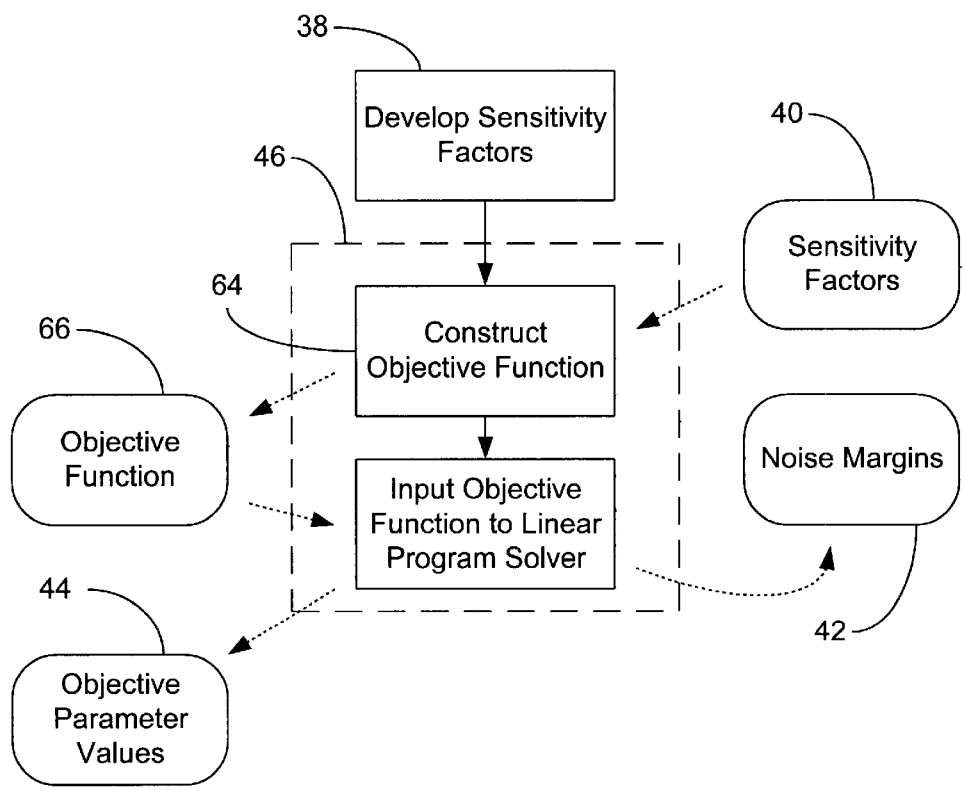
FIG. 5 is a flowchart of an example of a process for minimizing power costs to a circuit in accordance of one embodiment of the present invention.

Turning now to FIG. 5, the preferred approach to selecting objective parameter values 44 and modified noise margins is shown in greater detail at block 46. Specifically, it can be seen that an objective function 66 is constructed at block 64 based on the sensitivity factors 40. The objective function 66 is sent to a linear program (LP) solver such that the LP solver generates the objective parameter values 44 and the noise margins 42. LP solvers have been well documented and are commercially available from a number of sources.

Figure 6:
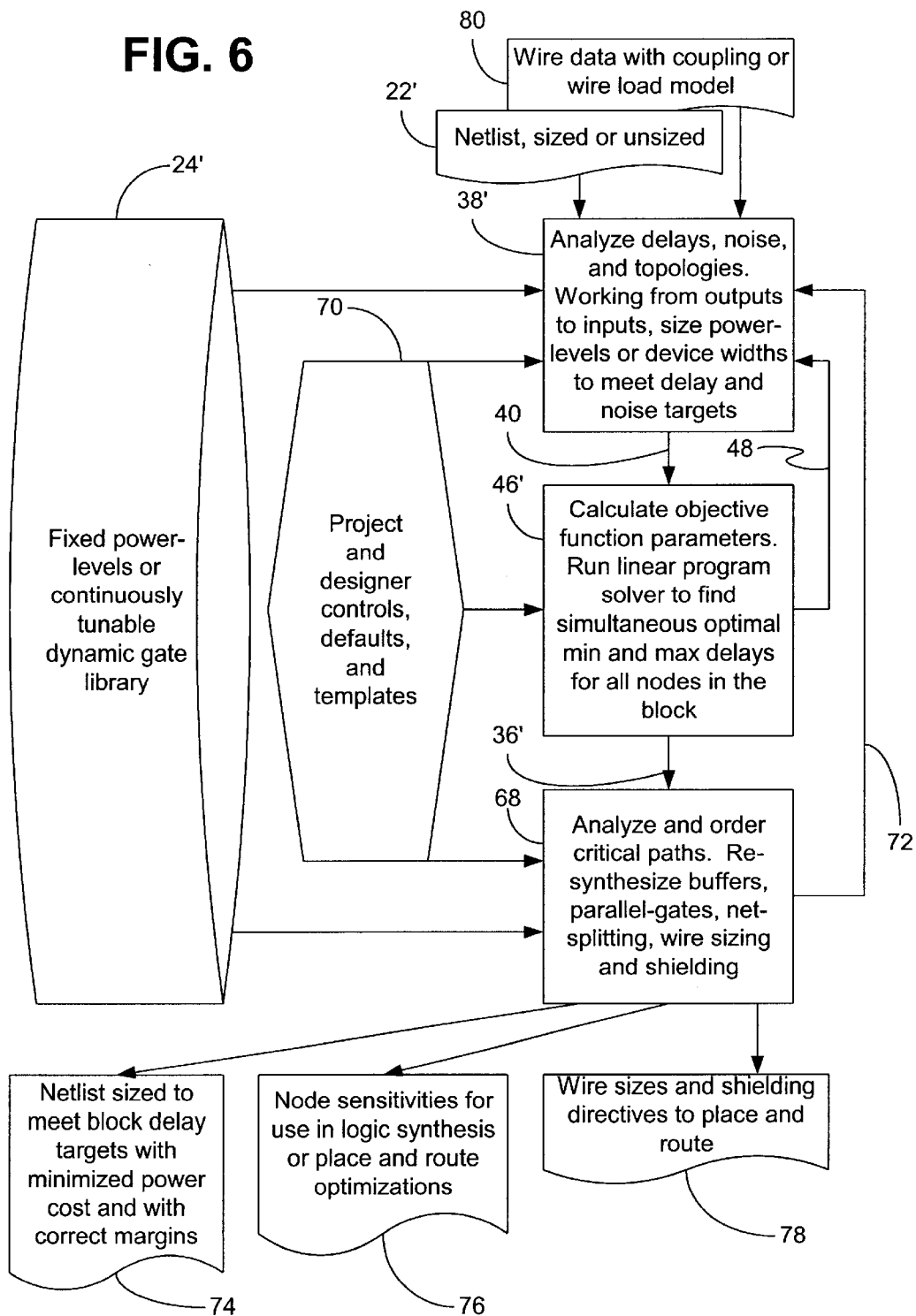
FIG. 6 is a block diagram showing an example of a dual-nested optimization approach in accordance with one embodiment of the present invention.

FIG. 6 shows the key elements of the timed synthesis flow in greater detail. Generally, processing blocks 38', 46' and 68 define three phases of the overall synthesis flow. In particular, processing block 38' provides for sizing and analysis, and block 46' provides for formulation of the objective function and revised constraints. Furthermore, block 68 provides for network re-synthesis and critical path analysis. Each of these phases will now be addressed in detail.

Sizing and Analysis—Phase One

Sizing and analysis is performed by analyzing the circuit topology and timing relative to block and technology file requirements. In particular, failures to meet limits such as maximum capacitances (CMAX), transition time (TT) targets, capacitive loading on inputs (CIN) or excesses on thresholds for fan-out or fan-in or capacitive loading on clocks are identified. These are input as penalty functions to the optimization phase. It should be noted that, standard timing analysis engines may be used for this step. The engine should be well calibrated with respect to the final verification engine and is preferably the same one. Furthermore, a noise constraint space is derived for all cells in the library. It is preferred that the library characterization is expressed as a polynomial function.

Once the circuit topology and timing is analyzed, the circuit is sized to meet minimum and maximum delay targets and noise targets, working from outputs to inputs, using given library characterization data and given targets. In particular, first pass sizing uses default targets given by the designer, project, or library, in combination with the environmental information (EVR) for the functional block (FUB) and a wire load model. In addition, delay targets after the first pass are fedback from the optimization phase; and the sizing module uses library characterization information for maximum delays, minimum delays, relative to hold time, contention, and other requirements as given by project or designer template inputs. The sizing module also uses library characterization information, if available, as a function of fan-out characteristics, such as ratio of coupling capacitance to total capacitance, total capacitance, resistance values, and worst case input noise margin of a receiving gate in the fan-out. The preferred approach is to extrapolate beyond any given maximum values. Furthermore, if maximum power levels or device sizes in the library are exceeded in order to get the delay, then the result is extrapolated for parallel re-powered gates. As already discussed, phase three re-synthesis will force the meeting of any constraints that are exceeded during the sizing and optimization phases.

It can further be seen that perturb delays are multiplied in positive and negative directions and a re-sizing is executed. Nodal power/delay sensitivities and bounds on sensitivities are calculated based on the results, and re-calculated on every pass. In particular, the costs of logic under the cone of influence of each node are included; and each sizing perturbation step includes the above sizing with respect to margins. It should be noted that standard dynamic step-size techniques are applicable, where the step size for each pass is a function of the trajectory and rate-of-change of the prior results. Furthermore, bounds on the sensitivities are also determined by default as a function (e.g. 2x) of step-size or by designer over-ride.

Phase one further provides for testing for escape from iteration according to whether changes in timing penalties or sizing result are small. Specifically, the change threshold for escape is set either by default, project, set-up, or a designer over-ride. It can be seen that if a small sizing change is found, but cost thresholds or timing penalty thresholds are exceeded, the synthesis flow proceeds to design phase three for network re-synthesis. Furthermore, if the stopping criteria are met, phase one outputs a netlist, sensitivity parameters, timing analysis results, and results from the previous phase three pass for critical path analysis and wire re-design directives. This information can be vital to getting custom-class results in convergence with place-and-route optimization and with logic synthesis.

It should be noted that wiring input 80 such as wire data with coupling or wire load models can be provided to processing block 38' to assist in the analysis of delays, noise and topologies.

Objective Function and Constraint Formulation—Phase Two

The objective function is formed based on the above calculated sensitivity and penalty parameters and the total power-cost of the block, and the optimization variable is delay. Bounds for delay and for transition times for each node are formed from template inputs and from timing-analysis/EVR results and from the range set for the sensitivity. In general, the sensitivity range is the most constraining bound. All bounds are re-formed on each pass.

The LP solver outputs a set of nodal delays that are exactly optimal with respect to the given parameters and bounds. In particular, it should be noted that although the LP solver always returns a result, the result may exceed some bounds. Furthermore, the LP solver is a standard product, which has seen many advances by vendors and academia. The best available in these products and techniques can be leveraged based on the given application.

As already discussed, optimized delays are fed back to the phase one modules for analysis and sizing. The iteration continues until stopping criteria are met following analysis in phase one. Furthermore, processing block 46' illustrates that both minimum and maximum delays are found. In this regard, it should be noted that conventional approaches fail to determine minimum delays when constructing timing margins.

Network Re-synthesis and Critical Path Analysis—Phase Three

The phase three module analyzes the topological graph to find the highest pathwise cost and penalty totals. Generally, the modified circuit characteristics 36', includes the optimized parameter values, which are used in the critical paths. Thus, block 68 further provides for correcting the objective parameters 24' and noise constraints, which are included in the designer input 70, for topological costs that are above a predetermined level. Iteration loop 72 provides for repeating the optimizing with the corrected objective parameters and noise constraints. Specifically, block 68 provides for splitting nets, merging nets, adding buffers, and substituting cells in the circuit with library cells, where the library cells have extended noise characteristics. The result is a modified netlist 74, which is sized to meet block delay targets with minimized power costs and with correct margins. Additionally, node sensitivities 76 can be used in logic synthesis or place and route optimization. It can further be seen that physical data 78 such as wire sizes and shielding directives can be also provided for place-and-route operations.

In particular, final analysis results are output for use by logic synthesis if the designer elects logic synthesis re-structuring or transforms, such as phase optimization, critical path extraction and re-minimization, or mapping to a difference library. Furthermore, nodes that have exceed library or template maximums for power levels, noise, or other characterization parameters are found.

For fan-outs greater than one (or some other given threshold), phase three splits the fan-out on nodes with exceeded maximums and distributes the loads represented by the receivers according to the pathwise cost information. In particular paths that are less critical are separated from more critical paths during this step; delays on these paths are reset to the maximum value for upsizing only as much as necessary in the net sizing and optimization phases. Furthermore, net splitting can be invoked by directives from place-and-route in order to reduce congestion caused by high fan-out nodes. In this regard, it should be noted that high fan-out nodes occur more frequently in high speed logic with aggressively flattened levels.

For fan-outs of one or less than some other given threshold, a buffering stage is added, according to the given template or rules-set for available buffers and the type of nodes on which they can be used. In dynamic logic, whether inverting or non-inverting buffers, or state-storage buffers need be used is a function of the type of node. In particular, if maximums are exceeded due to noise on low-fan-out nodes, phase three provides for the addition of shielding or the reduction of wire lengths. It is preferred that the list of these changes becomes directives to next pass of place-and-route.

For excessive penalty functions due to delays that are too fast (min-delays), buffering is added according to the given template or rules set for available buffers and the type of node on which they can be used. It should be noted that designer over-rides are supported on all of the above functions.

Figure 7:
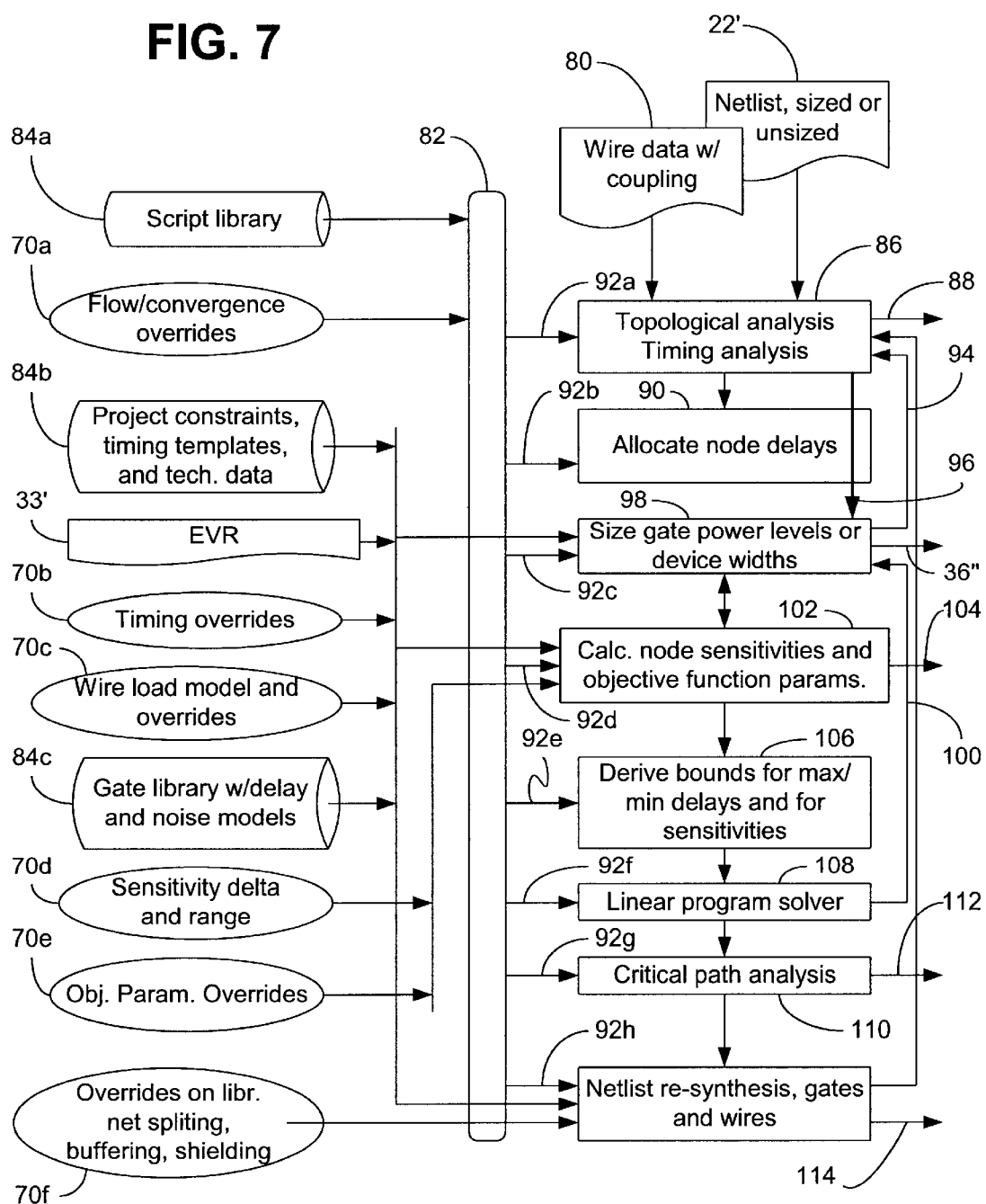
FIG. 7 is a detailed diagram of an example of timed synthesis flow in accordance of the present invention.

Turning now to FIG. 7, a detailed data flow of the preferred timed synthesis is shown. Generally, a FUB-specific flow control script or graphical user interface (GUI) 82 manages the optimization process. Designer input 70 can include a number of types of information. For example, flow overrides 70a, timing overrides 70b, wire load overrides 70c, sensitivity delta and range 70d, objective parameter overrides 70e, and library net overrides 70f are all useful in the optimization process. Non-block-specific files are shown generally at 84. A topological analysis module 86 uses wiring input 80 and netlist 22' to generate timing results 88 based on script output 92a from GUI 82 and other iterative data. Specifically, sizing iterative data 94 is used for noise and delays. An allocation module 90 allocates node delays based on script output 92b from the GUI 82, penalty parameters 96, and data from the topological analysis module 86.

A sizing module 98 generates an optimized, sized netlist 36" based on the penalty parameters 96, GUI script output 92c, and various other data as shown in FIG. 7. In particular, LP iterative data 100 is used to size gate power levels or device widths. It can further be seen that a sensitivity module 102 uses GUI script output 92d and a wide variety of data to generate node delays and power sensitivities 104. In addition, GUI script output 92e feeds a bounding module 106, while GUI script output 92f feeds the LP solver 108. As already discussed, a critical path module 110 can use GUI script output 92g to generate input/output (I/O) and clock criticalities 112. Shielding directives 114 result from re-synthesis module 116, which uses GUI script output 92h.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

We claim:

1. A computer implemented method of modifying characteristics of a circuit, the method comprising:

determining a set of objective parameters for the circuit;

receiving noise constraints for the circuit; and optimizing values of the objective parameters based on the noise constraints;

conducting a topological analysis on critical paths of the circuit, where the optimized objective parameter values are used in the critical paths;

correcting the objective parameters and noise constraints for topological costs that are above a predetermined level; and repeating the optimizing with the corrected objective parameters and noise constraints.

2. The method of claim 1 further including:

receiving timing constraints for the circuit; and optimizing the objective parameter values based on the timing constraints.

3. The method of claim 2 further including:

determining delay targets in accordance with the timing constraints, said delay targets including minimum and maximum delays for a plurality of nodes in the circuit.

4. The method of claim 1 further including:

receiving physical constraints for the circuit; and optimizing the objective parameter values based on the physical constraints.

* * * * *